(12) United States Patent
Schenk et al.

(10) Patent No.: US 6,231,098 B1
(45) Date of Patent: May 15, 2001

(54) TUNNEL COVERING FOR A MOTOR VEHICLE

(75) Inventors: Bernd Schenk, Horb; Tilo Volkmann, Sindelfingen, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/334,610

(22) Filed: Jun. 17, 1999

(30) Foreign Application Priority Data

Jun. 17, 1998  (DE) ............................................. 198 26 943

(51) Int. Cl.⁷ ...................................................... B60N 3/00
(52) U.S. Cl. ...................... 296/37.8; 296/24.1; 296/37.1; 296/37.14; 296/208; 224/400; 224/539; 224/540; 224/542
(58) Field of Search ................................ 296/24.1, 37.1, 296/208, 37.8, 37.14; 224/400, 539, 540, 542; 180/336

(56) References Cited

U.S. PATENT DOCUMENTS

| 3,356,409 | * | 12/1967 | Belsky et al. . | |
| 3,919,926 | | 11/1975 | Yamada | 98/2 |
| 5,897,155 | * | 4/1999 | Kerner et al. | 296/37.8 |

FOREIGN PATENT DOCUMENTS

| 196 15 320 C1 | 4/1996 | (DE) . | |
| 195 40 399 A1 | 5/1997 | (DE) . | |
| 2 260 296 | 9/1992 | (GB) . | |
| 2 312 189 | 4/1997 | (GB) . | |
| 61-64552 | * 4/1986 | (JP) | 224/542 |
| 6-72251 | * 3/1994 | (JP) | 224/539 |

* cited by examiner

*Primary Examiner*—D. Glenn Dayoan
*Assistant Examiner*—Lori L Coletta
(74) *Attorney, Agent, or Firm*—Evenson, McKeown, Edwards & Lenahan, P.L.L.C.

(57) ABSTRACT

A tunnel covering for a motor vehicle has a supporting structure in which at least one receiving space is provided, and at least one approximately vertically extending longitudinal wall. At least one lateral wall element is mounted on the integrally constructed supporting structure. The lateral wall element is assigned to the longitudinal wall of the supporting structure and which, at least in sections together with the lateral wall, bounds one or several hollow spaces.

7 Claims, 4 Drawing Sheets

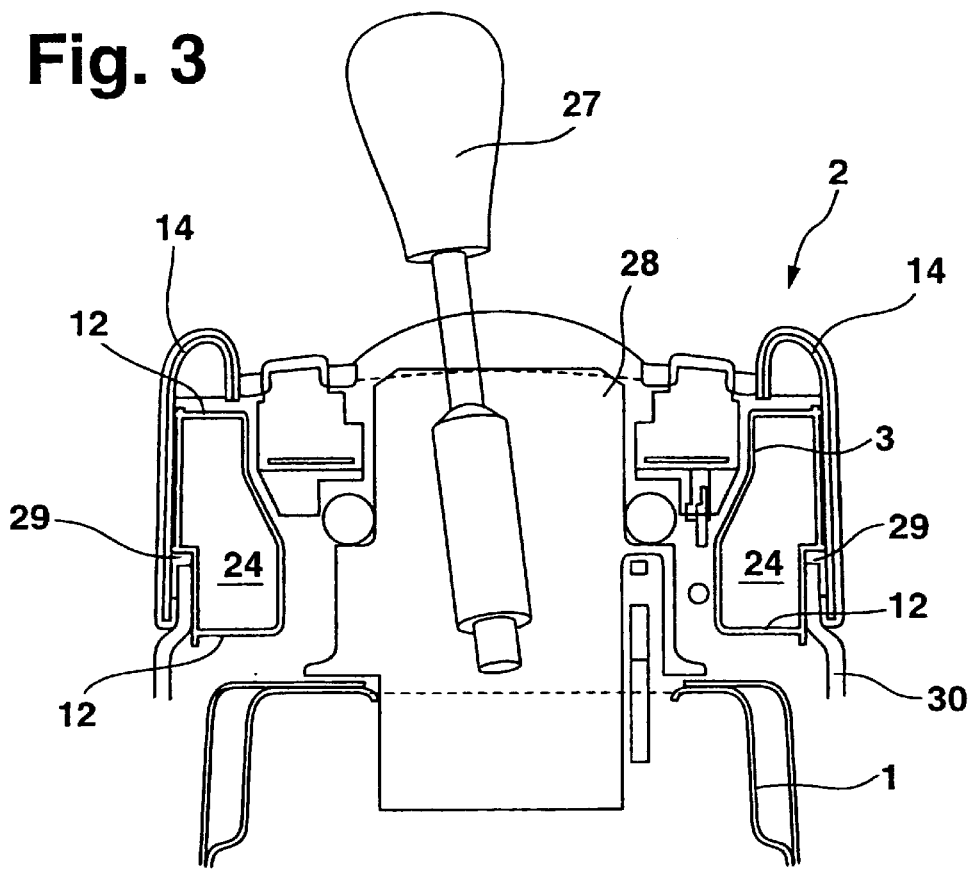
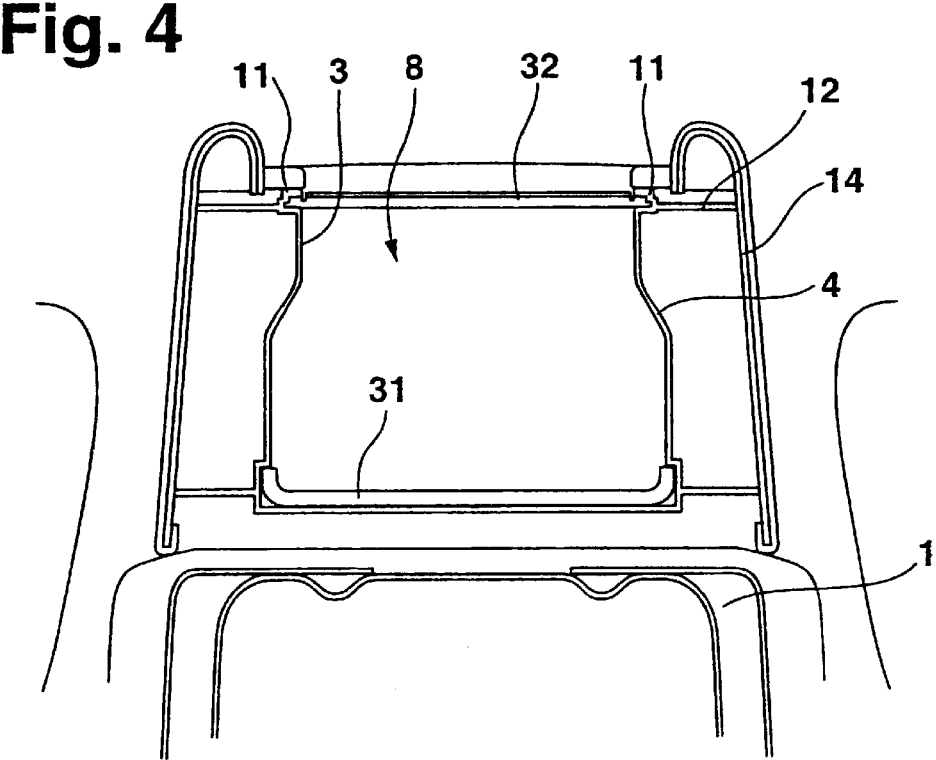

TUNNEL COVERING FOR A MOTOR VEHICLE

BACKGROUND OF THE INVENTION

This application claims the priority of 198 26 943.9-21, filed Jun. 17, 1998, the disclosure of which is expressly incorporated by reference herein.

The present invention relates to a motor vehicle tunnel covering having a supporting structure provided with at least one receiving space and at least one longitudinal wall aligned approximately vertically.

German Published Patent Application DE 195 40 399 A1 shows a center console in the form of a box-type tunnel covering construction reaching over the transmission tunnel. The tunnel covering construction has a plastic supporting structure which is shaped such that hollow, downwardly open double walls are obtained which are oriented in the vehicle longitudinal direction. The double walls are sealed off by insertion elements such that they can be used as air guiding ducts. An interior wall section also has an air opening for a receiving space provided in the tunnel covering. In sections, particularly in an area arranged between the backrests of the front seats, the supporting structure is reinforced by an integrated light-metal structure. The light-metal structure comprises several supporting elements, which are arranged in the vehicle transverse direction, and sheet metal shells which are worked into the exterior sections of the side walls.

DE 196 15 320 C1 shows a tunnel covering which has a multipart supporting structure formed of transverse and lateral partition walls. At the exterior side of at least one lateral partition wall, an additional lateral wall element is mounted. A duct is formed between the lateral partition wall and the lateral wall element. In the lateral partition wall, a ventilation opening is arranged above a receiving space provided within the tunnel covering. In addition, between a lateral partition wall and an assigned lateral wall element, reinforcing beads extending in the longitudinal direction of the vehicle are provided.

SUMMARY OF THE INVENTION

An object of the invention is to provide a tunnel covering which, while its construction is simple, has improved utilization characteristics and a high variability.

This object has been achieved in that at least one lateral wall element, which is assigned to the longitudinal wall of the supporting structure, is mounted on the supporting structure constructed in one piece. The lateral wall element, at least in sections, together with the longitudinal wall of the supporting structure, bounds one or several hollow spaces. In this manner, at least one hollow space is provided between the supporting structure and the lateral wall element and is used as an air duct through which a flow can easily take place in the longitudinal direction of the vehicle. While the interior supporting structure is maintained, different configurations of the tunnel covering can be implemented by differently designed and separately manufactured lateral wall elements which are joined to the supporting structure.

As a further aspect of the present invention, a ribbing, which is oriented in the vehicle transverse direction, is arranged between the supporting structure and the lateral wall element. Individual flat ribs between the supporting structure and the lateral wall element, which form the ribbing, are preferably arranged in approximately horizontal planes. Thereby, air flow ducts are provided which, on one hand, are oriented in the vehicle longitudinal direction and, on the other hand, result in a transverse reinforcing arrangement.

In another embodiment of the present invention, the ribbing is constructed in one piece with the supporting structure or the lateral wall element. In this manner, the ribbing can be integrated particularly easily between the supporting structure and the lateral wall element.

In another embodiment of the present invention, the supporting structure, the lateral wall element and the ribbing are undetachably fixedly connected with one another, particularly in a material-locking manner. As a result, a box-type tunnel covering is obtained which is stiff in the longitudinal as well as in the transverse direction and which can be used as a module in a vehicle.

In another embodiment of the invention, the hollow spaces are configured so that they can be utilized as an air guiding arrangement. Here, the ribbing is oriented particularly in the vehicle longitudinal direction and, at least in sections, is used as an air guiding device. A longitudinal wall of the supporting structure, at least one element of the ribbing and a lateral wall element define and bound an air guiding arrangement in the form of an air guiding duct which extends preferably from a tunnel covering forward area in which a fresh air feed is provided to a tunnel covering rearward area in which an air outlet is provided.

In another embodiment of the invention, at least one receiving tray is arranged in and constructed in one piece with the supporting structure. The receiving tray may be bounded by transverse walls which are used simultaneously as cross members for the supporting structure.

In another embodiment of the invention, at least one opening, which is used as an air inlet opening and/or as an air outlet opening for the receiving tray, is provided in the lateral wall of the supporting structure in the area of the receiving tray. In this manner, air can be supplied to and/or removed from the receiving tray so that the receiving tray is available as an air-conditioned space.

In yet another embodiment of the invention, at least two openings in the lateral wall of the supporting structure are assigned to the receiving tray. One opening is an air inlet opening connected with a first air guiding arrangement and another opening is an air outlet opening connected with a second air guiding arrangement. This arrangement permits a targeted air guidance in the receiving tray, particularly a continuous flow through the corresponding receiving tray. The air guidance preferably takes place from a first air guiding duct through the air inlet opening into the receiving tray and, from there, further through the air outlet opening into a second air guiding duct separated from the first.

BRIEF DESCRIPTION OF THE DRAWINGS

Other objects, advantages and novel features of the present invention will become apparent from the following detailed description of the invention when considered in conjunction with the accompanying drawings.

FIG. 3 is a sectional view of the tunnel covering along line III—III of FIG. 1 in the area of a gear shift lever;

FIG. 4 is a sectional view of the tunnel covering along line IV—IV of FIG. 1 in the area of a first receiving tray;

DETAILED DESCRIPTION OF THE DRAWINGS

Figure 1:
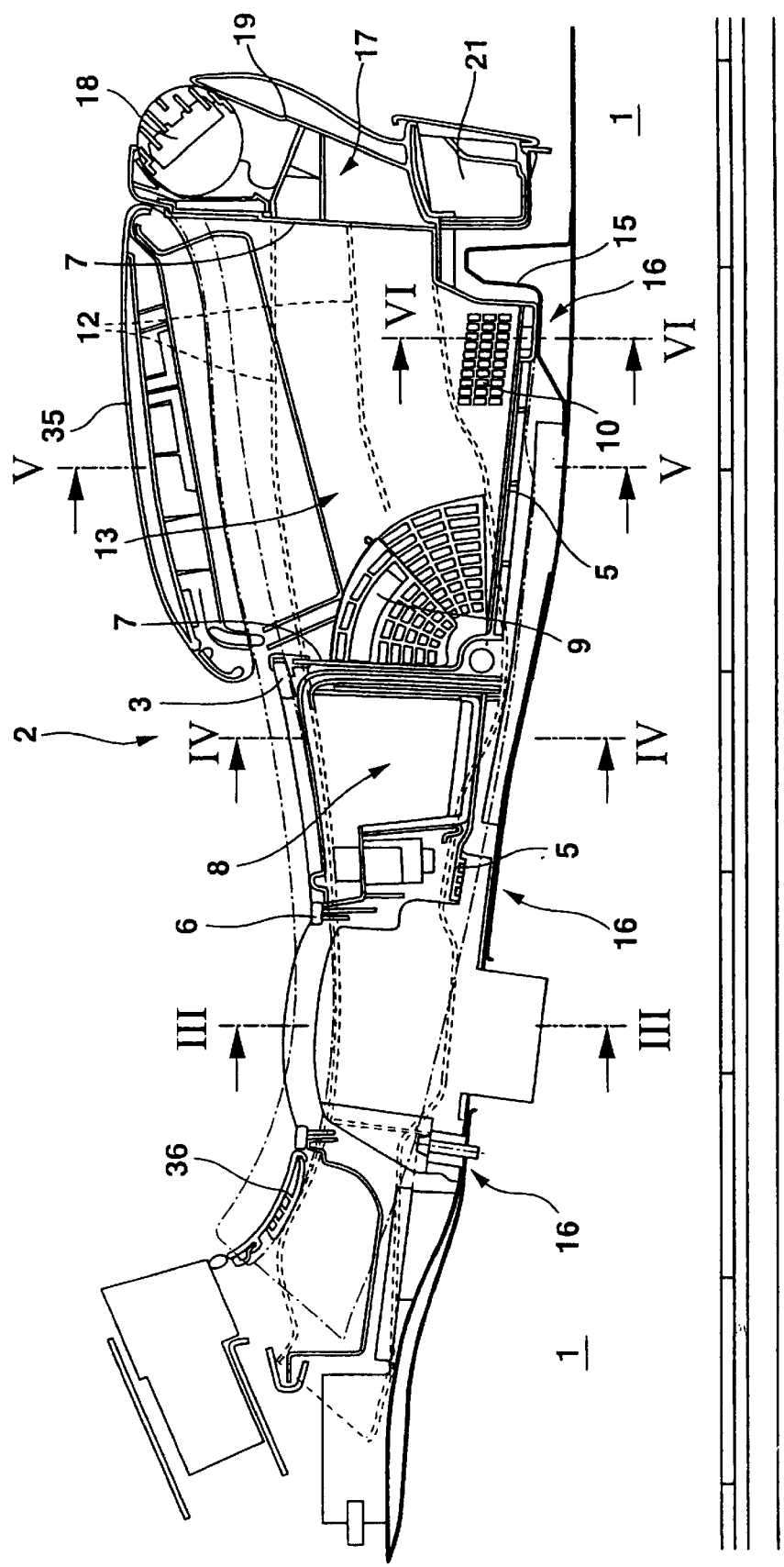
FIG. 1 is a cut-away side view of a tunnel covering according to the invention placed on a motor vehicle transmission tunnel.

FIG. 1 illustrates a transmission tunnel 1 of a motor vehicle cut in the longitudinal direction of the vehicle and having a fitted-on tunnel covering 2. The tunnel covering 2 extends in the longitudinal direction of the vehicle from an area of an instrument panel into the rear compartment of the motor vehicle. For the form-locking fixing of the tunnel covering 2 on the transmission tunnel 1, a holder 15 is fixedly connected with the transmission tunnel and engages from below in the tunnel covering and also has several screwed connections 16.

Figure 2:
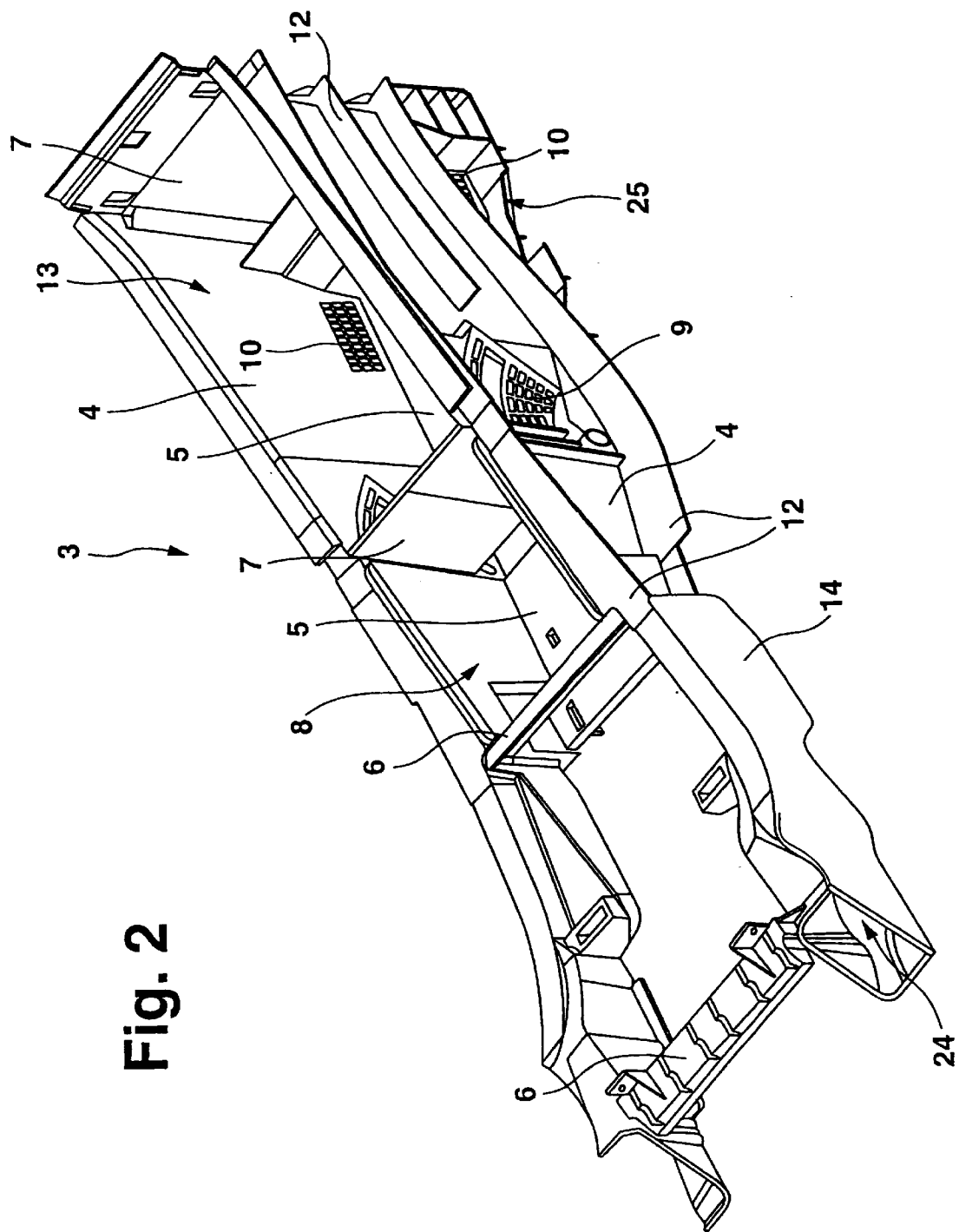
FIG. 2 is a perspective view of a supporting structure of the tunnel covering shown in FIG. 1.

The backbone of the tunnel covering 2 is a supporting structure 3 which is shown separately in FIG. 2. The supporting structure 3 has essentially two perpendicularly aligned longitudinal walls 4, several bottom elements 5, several cross members 6 oriented in the vehicle transverse direction as well as several transverse walls 7. Furthermore, on the exterior sides of the longitudinal walls 4, ribs 12 extend in the vehicle longitudinal and the transverse directions to form a large-space ribbing. The above-mentioned partial elements are connected to a unit or constructed in one piece. In particular, welding or diecasting can be used as the manufacturing process, and the used materials can be light metal, such as aluminum or magnesium, steel or a plastic material. The thus-formed supporting structure 3 has additional details indicated below and represents a carrying structure for various other components to be mounted thereon, such as ashtrays 21, covers 35 or other coverings 36.

Flat lateral wall elements 14 are joined laterally to the supporting structure 3 and are fixedly connected particularly with the ribs 12. A material-locking process, as, for example, vibration welding, can be used as the joining process. In this manner, as illustrated in FIGS. 3 to 6, the lateral wall elements 14 are reliably and rigidly connected with the ribs 12 and thus with the supporting structure 3. The supporting structure 3 and the lateral wall elements 14 together form a structure which is deformation-resistant in the longitudinal direction as well as in the transverse direction of the vehicle and which can transmit forces and, as required, in the event of a deformation, has a significant energy absorption capacity.

Furthermore, hollow spaces are bounded between the longitudinal walls 4 of the supporting structure 3 and the lateral wall elements 14 fitted onto the ribs 12. The hollow spaces extend from the forward to the rearward end of the tunnel covering 2 and are suitable as air guiding ducts. A rearward cover 19, which is preferably locked to the supporting structure, forms the rear-side end of the tunnel covering 2 and thus also of the air guiding ducts 24. A ribbing 17, which extends in the transverse direction, guides the air flows carried in the air guiding ducts 24 to two air outlet nozzles 18 which are arranged side-by-side in the vehicle transverse direction and by way of which the rear compartment of the motor vehicle can be supplied with fresh air.

In a modified embodiment, the ribbing 12 is constructed at least partially in one piece with the lateral wall elements 14.

FIGS. 3 to 6 illustrate several cross-sections of the tunnel covering 2 of FIG. 1 to show the concrete construction of an embodiment of the present invention. FIG. 3 is a sectional view of the tunnel covering in the area of a gear shift lever 27 inserted in the tunnel covering 2. Including a pertaining shifting unit 28, the gear shift lever 27 is fixed on the transmission tunnel 1 of the motor vehicle. A sufficient positional and shape tolerance exists between the shifting unit 28 and the tunnel covering 2.

As further illustrated in FIG. 3, grooves 29 can be provided between the ribbing 12 on the part of the supporting structure 3 and the lateral wall elements 14. Elements of the occupant compartment covering, particularly carpet ends 30, can be inserted into the grooves 29. The lateral wall elements 14, which in addition can be represented in various design and shape variants, permit a visually attractive design of the occupant compartment. They may be covered and paneled with different materials, such a foil, fabric, carpet or leather.

FIG. 4 is a sectional view of the tunnel covering 2 according to FIG. 1 in the area of the front seats of the motor vehicle and of a first receiving tray 8. The receiving tray 8 is formed directly by the supporting structure 3, a bottom insert 31 as well as a shade 32 being used for covering the receiving tray 8. The shade is disposed in two guides 11 which are constructed in one piece with the supporting structure 3. As an alternative or in addition, a separate tray may be provided which can be inserted in the supporting structure.

A receiving tray 13 can be provided as an air-conditioned storage space. For this purpose, within the scope of the present invention, at least one air inlet opening 9 is provided in one of the longitudinal walls 4, through which a portion of the fresh air flowing in the air guiding ducts 24 can arrive in the air-conditioned storage space 13. Openings in the longitudinal walls 4, which are used as air outlet openings 10, are also assigned to the storage space 13. Through the openings 10, air flowing out of the storage space 13 can arrive in a separate outlet duct 25 separated from the air guiding ducts 24. This ensures a continuous and targeted flow through the storage space 13, and the amount of the supplied air can be adjusted by a manually operable slide for opening and closing of the air inlet opening 9.

Figure 5:
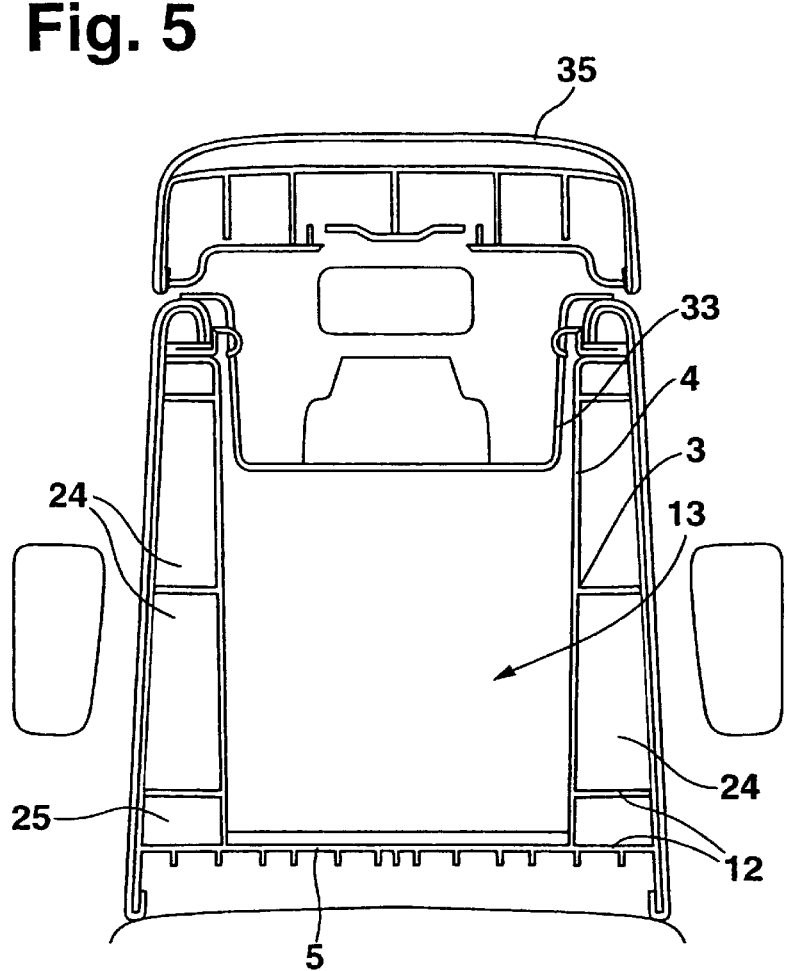
FIG. 5 is a sectional view of the tunnel covering along line V—V of FIG. 1 in the area of a second air-conditioned receiving tray.
Figure 6:
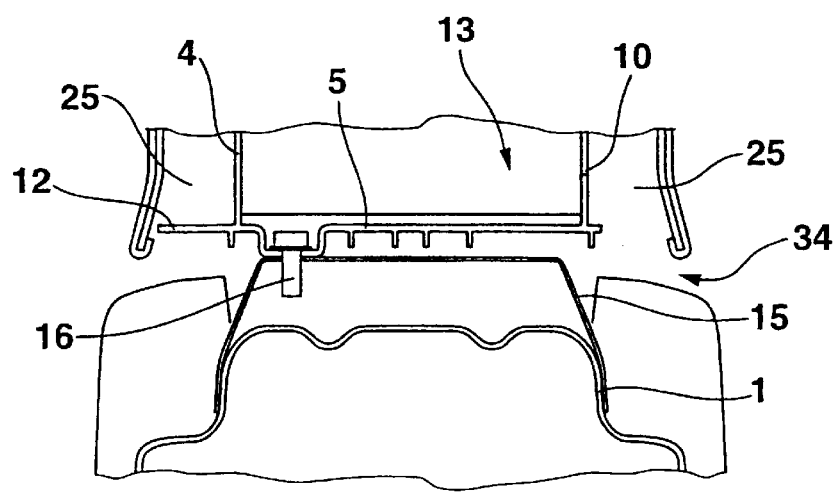
FIG. 6 is a partial sectional view of the tunnel covering along Line VI—VI of FIG. 1 in the bottom area of the second air-conditioned receiving tray.

FIGS. 5 and 6 are sectional views of the air-conditioned storage space 13 which is closed off toward the top by an insert 33 containing an operating unit, such as a car telephone. FIG. 5 illustrates how the ribbing 12 extending in the longitudinal direction of the vehicle, together with the longitudinal walls 4 on the part of the supporting structure 3 as well as the fitted-on lateral wall elements 14, on one hand, form a stable carrying structure and, on the other hand, an air guiding arrangement. The ribs 12 are used as air guiding devices. In particular, the ribs 15 separate individual air guiding ducts 24 from one another and from the outlet duct 25.

FIG. 6 shows details of the outlet ducts 25. The right-side outlet duct leads into an air outlet opening 34 through which air flowing out of the storage space 13 is released into the vehicle occupant compartment.

For a utilization of the tunnel covering 2 as a device for air conditioning the vehicle occupant compartment, air supply openings are provided on the forward end of the tunnel covering 2 between the supporting structure 3 and the lateral wall elements 14. Through these air supply openings, particularly by way of a fan of the air conditioner, fresh air can be delivered into the air guiding ducts 24. Because the tunnel covering 2 extends from the area of the instrument panel into the rear compartment of the vehicle, lateral air outlets can be provided in front of, between and/or behind the front seats in the lateral wall elements 14. In particular, differently conditioned air can be admitted to the different air guiding ducts 24 by way of the air conditioner and to achieve in this manner a different air conditioning of the right and the left side of the vehicle occupant compartment.

The tunnel covering 2 according to the invention is distinguished by a high stiffness which permits the use of the tunnel covering 2 as a so-called crash box between the front seats of a motor vehicle. It can therefore also be used in the case of motor vehicles without a transmission tunnel. As a result of the integrated air guiding ducts 24, the tunnel covering 2 according to the present invention permits a comfortable air conditioning of the entire occupant compartment of the motor vehicle, including the rear compartment. Large flow cross-sections and few deflections provide an optimized air guidance. Furthermore, an improved air conditioning of a storage space 13 arranged in the tunnel covering 2 is possible.

The construction of the tunnel covering 2 by way of supporting structure 3 with lateral wall elements 14 attached from the outside also offers the possibility of producing embodiments of the tunnel covering 2 within the scope of the present invention by lateral wall elements of different designs and/or covered with different materials. Furthermore, additional non-supporting elements of the interior covering of the vehicle can be placed on the tunnel covering 2. Such a tunnel covering 2 can be installed as a complete module into a motor vehicle.

A motor vehicle having a tunnel covering 2 according to the present invention preferably has, at the level of the tunnel covering 2, at least one cross member element which extends between the tunnel covering 2 and a lateral wall of the vehicle body or a vehicle body side member. The cross member element may, in particular, be integrated in a front seat of the vehicle and, together with the tunnel covering 2, is used as a force transmission arrangement. The motor vehicle body can therefore be effectively stiffened by the tunnel covering 2 according to the present invention and corresponding cross member elements. For an optimal force transmission, a cross member is provided inside the tunnel covering 2 and is aligned with assigned cross member elements. This cross member may be configured as an integral component of the supporting structure 3, particularly as a transverse wall 7.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A tunnel covering for a motor vehicle, comprising an integrally constructed supporting structure having at least one receiving space defined by opposed approximately vertically extending longitudinal walls, at least one lateral wall element operatively mounted on the integrally constructed supporting structure and associated with at least one of the longitudinal walls and which, at least in sections, together with the respective longitudinal wall, bounds at least one hollow space, and a ribbing arranged external to the at least one longitudinal wall on a side thereof opposite to the at least one receiving space and provided between the supporting structure and the at least one lateral wall element, in a transverse direction of the motor vehicle and in one piece with the supporting structure or the at least one lateral wall element, wherein the supporting structure, the at least one lateral wall element and the ribbing are undetachably fixedly connected with one another.

2. The tunnel covering according to claim 1, wherein the supporting structure, the at least one lateral wall element and the ribbing are connected by material locking.

3. The tunnel covering according to claim 1, wherein the at least one hollow space comprises an air guiding arrangement, and the ribbing is oriented in a longitudinal direction of the motor vehicle and, at least in sections, constitutes an air guiding device.

4. The tunnel covering according to claim 1, wherein at least one receiving tray is arranged in one piece in the supporting structure.

5. The tunnel covering according to claim 4, wherein the at least one hollow space comprises an air guiding arrangement, and the ribbing is oriented in a longitudinal direction of the motor vehicle and, at least in sections, constitutes an air guiding device.

6. The tunnel covering according to claim 4, wherein at least one opening constitutes at least one of an air inlet opening and an air outlet opening for the at least one receiving tray and is provided in the longitudinal wall of the supporting structure in a region of the receiving tray.

7. The tunnel covering according to claim 4, wherein at least two openings in the lateral wall of the supporting structure are associated with the receiving tray, one of the openings being an air inlet opening connected with a first air guiding arrangement and another of the openings being an air outlet opening connected with a second air guiding arrangement.

* * * * *